(12) United States Patent
Ohshima

(10) Patent No.: US 6,856,112 B2
(45) Date of Patent: Feb. 15, 2005

(54) POWER WINDOW DRIVING DEVICE

(75) Inventor: Shunzou Ohshima, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/715,479

(22) Filed: Nov. 19, 2003

(65) Prior Publication Data
US 2004/0222759 A1 Nov. 11, 2004

(30) Foreign Application Priority Data

Nov. 19, 2002 (JP) ................................. P2002-335311

(51) Int. Cl.⁷ .............................................. H02P 1/00
(52) U.S. Cl. ....................... 318/286; 318/445; 318/446; 318/453
(58) Field of Search ................................ 318/466, 468, 318/280, 476, 282, 445, 446, 453

(56) References Cited

U.S. PATENT DOCUMENTS

| 5,734,245 A | 3/1998 | Ishikawa et al. |
| 6,054,822 A | 4/2000 | Harada |
| 2002/0190690 A1 * | 12/2002 | Tamai et al. ................. 320/103 |
| 2003/0160510 A1 * | 8/2003 | Mizutani et al. ............ 307/10.1 |

FOREIGN PATENT DOCUMENTS

| DE | 10011982 A | 9/2001 |
| JP | 10-25964 A | 1/1998 |
| JP | 10-313582 A | 11/1998 |
| JP | 2000-299627 A | 10/2000 |
| JP | 2001-020605 A | 1/2001 |
| JP | 2002-295129 A | 10/2002 |

* cited by examiner

Primary Examiner—Karen Masih
(74) Attorney, Agent, or Firm—Sughrue Mion, PLLC

(57) ABSTRACT

A power window driving device includes a reference-current generator, generating a reference current having a level which corresponds to the size of a motor current flowing into a drive motor for driving a power window, a first current generator, generating a first current having a level which corresponds to a variable mount value of the motor current, a second current generator, generating a second current equalized to the reference current by adding to the first current, a comparison signal generator, generating a comparison signal by converting the first current into voltage, a comparator, comparing the comparison signal with a reference voltage signal generated on the basis of the comparison signal, and a reverser, stopping or reversing the drive motor based on a result of the comparator which determine that a steep current increase is occurred in the motor current. When the first current repeats decease and increase in excess of a predetermined value in a predetermined period, the second current is increased for a predetermined period in respective cycles of the decrease and the increase of the first current so that the increase of the first current is relatively retrained or the decrease of the first current is relatively promoted for decreasing a detection sensitivity to a current increase in the motor current.

7 Claims, 7 Drawing Sheets

POWER WINDOW DRIVING DEVICE

BACKGROUND OF THE INVENTION

The present invention relates to a power window driving device for controlling a power window provided in a vehicle and more particularly to the art of preventing the misreversing of a power window while the vehicle provided with the power window driving device drives on a rough and bumpy road.

The window glass of power windows mounted on the vehicle is connected to a drive motor and by throwing switches reversibly to rotate the drive motors, the window glasses move upward or downward. Moreover, some power window that has been proposed and put to practical use functions as what prevents damage to not only the obstacle caught in the power window but also the power window itself while the window glass is moving upward by stopping the drive motor and further reversing the rotating direction of the drive motor so as to move the window glass downward.

With such a related power window driving device, the art of suspending the operation of and reversing direction of the drive motor is disclosed in JP-A-10-25964 (FIG. 1) in which a driving device is suspended and reversed when an obstacle is so pinched in the power window that an increase of the electric current flowing through the drive motor exceeds a predetermined level.

With the related power window driving device, however, there may arise malfunction that the power window is stopped and moved reversely when the current flowing into the drive motor fluctuates, although any obstacle is not actually caught in the power window.

This kind of occurrence is often caused by rough roads on which vehicles travel. When the window glass is moved upward while a vehicle is traveling on a rough road, the window-glass driving force varies with the vibration (up and down motion) of the vehicle body and so does the current flowing into the drive motor. Consequently, the problem is that the power window driving device tends to misjudge that an obstacle is actually caught in the power window and then operates to move the window glass reversely.

SUMMARY OF THE INVENTION

It is therefore an object of the present invention to provide a power window driving device capable of detecting any obstacle caught in a power window for certain without malfunction even while a vehicle is traveling on a rough road.

In order to achieve the above object, according to the present invention, there is provided a power window diving device, comprising:

a reference-current generator, generating a reference current having a level which corresponds to the size of a motor current flowing into a drive motor for driving a power window;

a first current generator, generating a first current which is a part of the reference current and corresponds to a variable quantity in the motor current;

a second current generator, generating a second current which is a part of the reference current and to which adding the first current results in the prescribed reference current;

a comparison signal generator, generating a comparison signal by converting the first current into voltage;

a comparator, comparing the comparison signal with a reference voltage signal generated on the basis of the first current; and a reverser, stopping or reversing the drive motor based on a result of the comparator which determine that a steep current increase is occurred in the motor current, wherein when the first current repeats decrease and increase in excess of a predetermined value in a predetermined period, the second current is increased for a predetermined period in respective cycles of the decrease and the increase of the first current so that the increase of the first current is relatively retrained or the decrease of the first current is relatively promoted for decreasing a detection sensitivity to a current increase in the motor current.

Preferably, the second current is increased by decreasing the reference voltage signal for a predetermined period in the respective cycles of the decrease and the increase of the first current.

Preferably, a capacitor is connected to a reference voltage signal source. In the cycle of increase of the first current, the capacitor is discharged so as to flow a discharge current from the capacitor into the route of the second current in a superposed condition, so that the second current is increased. In the cycle of decrease of the first current, the capacitor is charged with a current from the reference voltage signal source so as to decrease the reference voltage signal, so that the second current is increased.

Preferably, the power window driving device further comprises a rough road-mode signal generator, outputting a rough road-mode signal in the cycle of increase of the first current and stopping the rough road-mode signal in the cycle of decrease of the first current. The second current is increased for a predetermined period each time an output of the comparator is inverted from an output at a normal state, while the rough road-mode signal is output.

Here, it is preferable that, a capacitor is connected to a reference voltage signal source. The capacitor is charged with a current from the reference voltage signal source so as to decrease the reference voltage signal while the rough road-mode signal is output when an output of the comparator is inverted from the output at the normal state, so that the second current is increased.

Here, it is preferable that, the power window driving device as set forth in claim 4, further comprising a counter, counting the number of times the output of the comparator is inverted from the output at the normal state while the rough road-mode signal is output. When the count exceeds a predetermined number of times, the reverser stops or reverses the drive motor.

Preferably, the reference voltage signal is generated from a voltage which is converted from the first current by means that the ratio of the time when the reference voltage is higher than the converted voltage to the time when the reference voltage is lower than the converted voltage converges to 1.

In the above configurations, the vehicle is decided to be traveling on the rough road when frequency fluctuation in the predetermined frequency bands (ranging from about 10–15 Hz) occurs in the motor current flowing into the drive motor and control is exerted so that the voltage difference between the comparison signal (voltage Vins) and the reference value (reference voltage Vc) is enlarged to detect a steep current increase. Therefore, even when a certain amount of current fluctuation occurs during travel on the rough road, the comparison signal (voltage Vins) is prevented from being lower than the reference voltage signal (voltage Vc), so that the misreversing of the power window is avoided.

While the vehicle is traveling on the rough road, further, as the number of inversions of the comparator increases (e.g., three times or greater) in the rough road mode when an obstacle is actually caught in the power window, the occurrence of pinching the obstacle in the power window is detectible for certain by counting the number of inversions even during travel on the rough road.

BRIEF DESCRIPTION OF THE DRAWINGS

The above objects and advantages of the present invention will become more apparent by describing in detail preferred exemplary embodiments thereof with reference to the accompanying drawings, wherein:

FIG. 3A when no fluctuation occurs in a motor load; FIG. 3B when the motor load increases; and FIG. 3C when the motor load decreases;

DETAILED DESCRIPTION OF THE PREFERRED EMBODIMENTS

Figure 1:
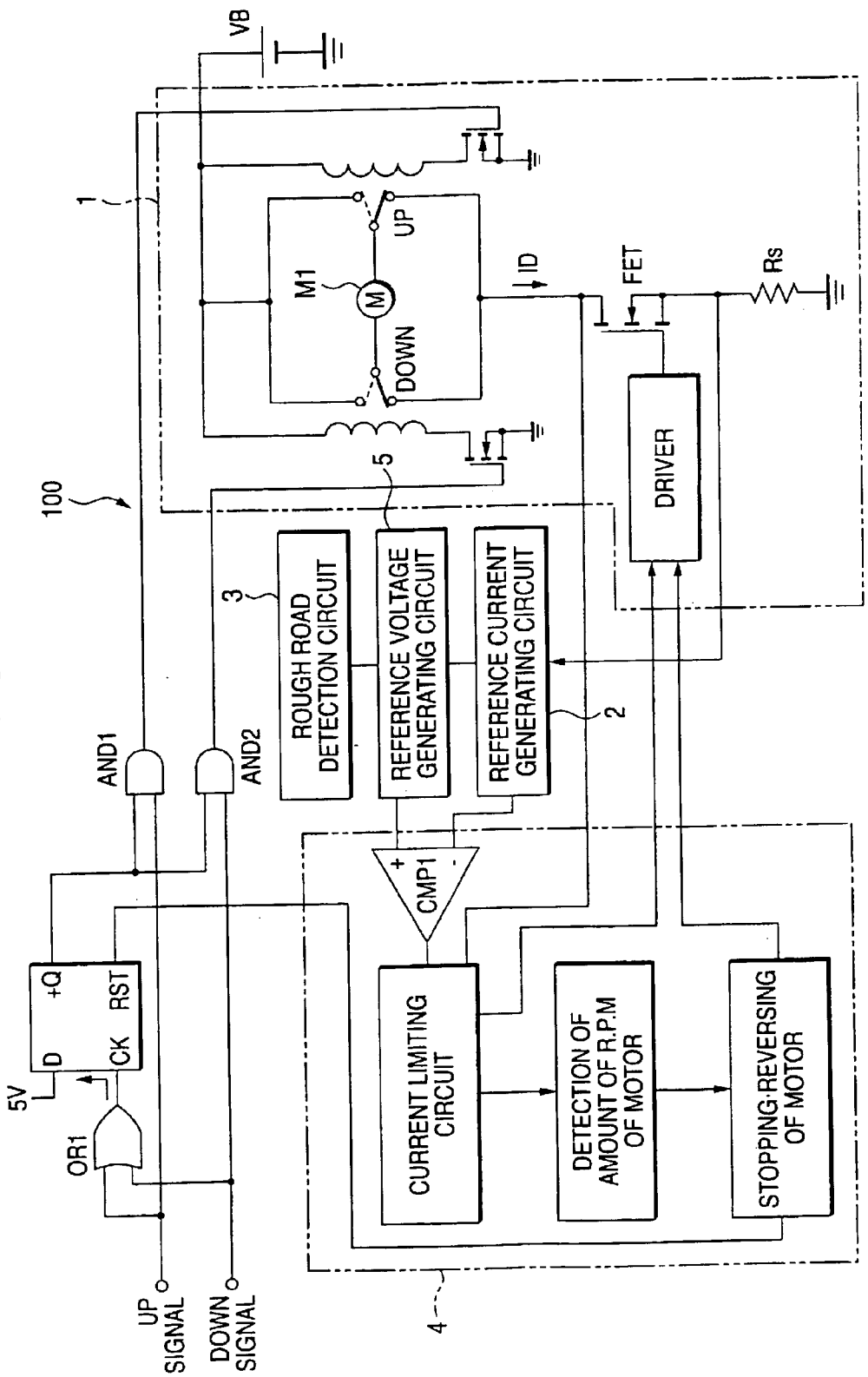
FIG. 1 is a block diagram showing the construction of a power window driving device according to a first embodiment of the invention.
Figure 2:
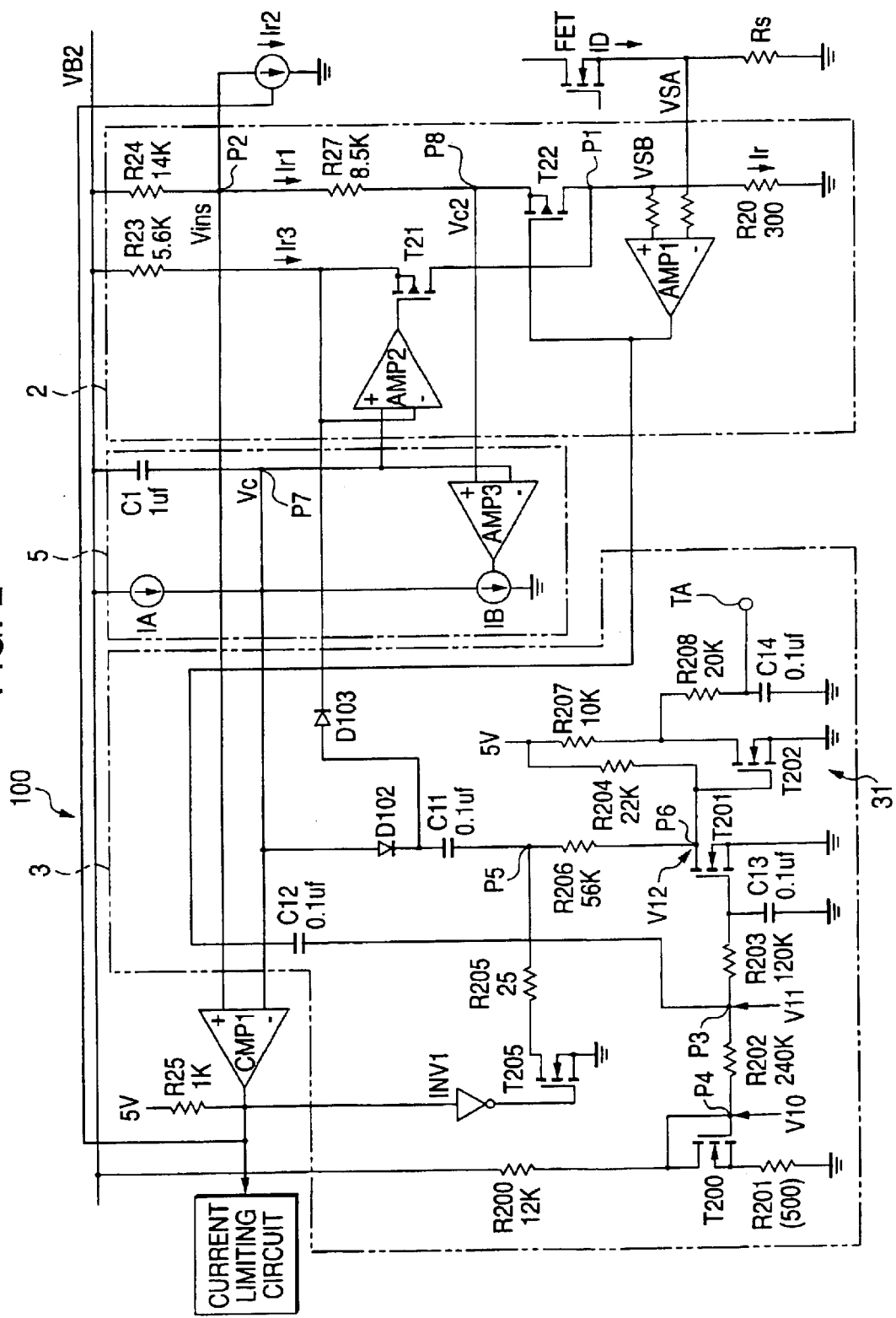
FIG. 2 is a circuit diagram showing the construction of the power window driving device according to the first embodiment of the invention.

The embodiments of the present invention will be described with reference to attached figures. FIG. 1 shows a power window driving device according to the invention; and FIG. 2 shows a detailed circuit diagram according to the invention.

As shown in FIG. 1, a power window driving device 100 according to the invention is provided in the interior of a vehicle and used for moving up and down the window glass of a power window provided therein. The power window driving device 100 includes a motor driving circuit including a drive motor M1, a reference-current generating circuit 2 for generating a current Ir (=Ir1+Ir3; reference current) proportional in size to a current ID flowing into the drive motor M1, a reference-voltage generating circuit 5 for detecting the size of a change in the reference current, and a rough road detection circuit 3 for detecting a pulsating component, if any, in the current ID in predetermined frequency bands (ranging approximately from 10 to 15 Hz) so as to decide that the vehicle is traveling on a rough road. For example, the current Ir is approximately 1/15000 of ID in size.

Further, the power window driving device 100 includes a comparator CMP1 for comparing a voltage Vins (a comparison signal) corresponding to a variable quantity of the current ID flowing into the motor driving circuit 1 with a predetermined reference voltage Vc (reference level) so as to output a decision signal according to the result of comparison, and an inverting control circuit 4 for reversing the rotating direction of the drive motor M1 in the motor driving circuit 1 when the comparator CMP1 detects that a steep increase of the current ID flowing into the motor driving circuit 1 exceeds a level based on the reference voltage Vc and when the continuation of the increase of the current ID exceeds a predetermined time.

The inverting control circuit 4 performs a current limiting operation by controlling an FET (N-channel MOS transistor) in the motor driving circuit 1 when a steep current increase occurs in the drive motor M1 and when the output signal of the comparator CMP1 is inverted from H to L in level. The current limiting operation includes two steps. The first step is to hold the drain-to-source voltage between ¼–¾ of power supply voltage by turning on and off the gate voltage of the FET alternately (hereinafter called an on/off operation). The second step is to hold the FET in the ON state continuously. These two steps repeat one after the other. When an obstacle is caught in the power window, rotating speed of the motor lowers while the current limiting operation is performed. When a decrease in the number of rotations of the motor reaches a predetermined reduction, a relay contained in the motor driving circuit is used to cut off the motor current and then the motor is driven to rotate reversely after the passage of predetermined time.

Further, the current limiting operation is discontinued when a steep current increase disappears during the current limiting operation and the FET is driven to continuously operate, so that the rotation of the drive motor M1 (in the forward direction) is continued in succession.

As shown in FIG. 2, the reference-current generating circuit 2 branches out into two systems: the first branch line includes a resistor R24, a resistor R27 and an FET (T22) that are connected in series, whereas the second branch line includes a resistor R23 and an FET (T21) that are connected in series. Further, a node P1 between the drain of the FET (T22) and the drain of the FET (T21) is grounded via a resistor R20. Moreover, DC voltage VB2 is supplied to one end of the resistor R23 and one end of the resistor R24 from a vehicle-borne battery. In this case, current flowing into the first branch line is called Ir1 (the first current), whereas current flowing into the second branch line is called Ir3 (the second current).

A node P2 between the resistor R24 and the resistor R27 is connected to the plus-side terminal of the comparator CMP1.

The gate of the FET (T22) is connected to the output of an amplifier AMP1 and the plus-side input of the amplifier AMP1 is connected to the node P1 (VSB) via a resistor. The minus-side input of the amplifier AMP1 is connected to the shunt resistance Rs (VSA) of the motor driving circuit 1. Therefore, a signal corresponding to a difference between a voltage VSA corresponding to the current ID flowing into the drive motor M1 and a voltage VSB corresponding to the current Ir (=Ir1+Ir3) flowing to the node P1 is output from the amplifier AMP1 and this output signal is supplied to the gate of the FET (T22). Consequently, the amplifier AMP1 is controlled so that the current ID and the current Ir show a predetermined ratio (e.g., a ratio of 15000 to 1).

The output of an amplifier AMP2 is connected to the gate of the FET (T21). The minus-side input of the amplifier AMP2 is connected to a coupling point between the resistor R23 and the source of the FET (T21) and the plus-side input of the amplifier AMP2 is connected to the minus side terminal P7 of a capacitor C1 contained in the reference-voltage generating circuit 5.

The voltage Vc at the node P7 is the reference voltage and the Vc is generated by charging and discharging the capacitor C1 with constant currents IA and IB. The constant current 1A is kept flowing at all times, whereas the constant current 1B is permitted to flow only when the output of an amplifier AMP3 is L in level. When the output of the amplifier AMP3 is H in level, the IB is turned off. As the setting of IB=2×IA is arranged, the cap or C1 is charged with IA (which flows into P7) when the output of he amplifier AMP3 is H and the capacitor C1 is discharged 1A when the output of the amplifier AMP3 is L and when IB−IA=IA is satisfied (IA flows out of P7). The minus-side input of the amplifier AMP3 is connected to P7, whereas the plus-side input thereof is connected to a node P8 between R27 and the source of the FET (T22).

The motor current ID contains the pulsating component. This is because the relative position between the commutator segment and the brush varies whereby to cause current fluctuations equal to the number of segments per motor revolution. Although the pulsating component is contained in the reference current Ir as well, Ir3 is controlled by Vc in terms of Ir3=(VB2−Vc)/R23. As Vc is unable to change suddenly, Ir3 is also unable to deal with (follow) the pulsating component. Therefore, all the pulsating component contained in the reference current Ir shifts into Ir1. Given that the voltage at the node P8 is Vc2, voltage fluctuation synchronous with the pulsating component is thus generated in Vc2. The motor current ID is also fluctuated by load fluctuation. The fluctuation of the motor current because of the pulsating component and the load fluctuation is totally reflected in Vc2.

When Vc2 is larger than Vc, the output of the amplifier AMP3 is changed to H and the capacitor C1 is charged or discharged in the other way around. The potential fluctuation of Vc2 is derived from only the pulsating component if there is no motor load fluctuation and in this case, the average value of voltage Vc2 becomes constant. At this time, Vc is stabilized when a ratio of time at Vc2>Vc to time at Vc2<Vc is equalized.

Figure 3:
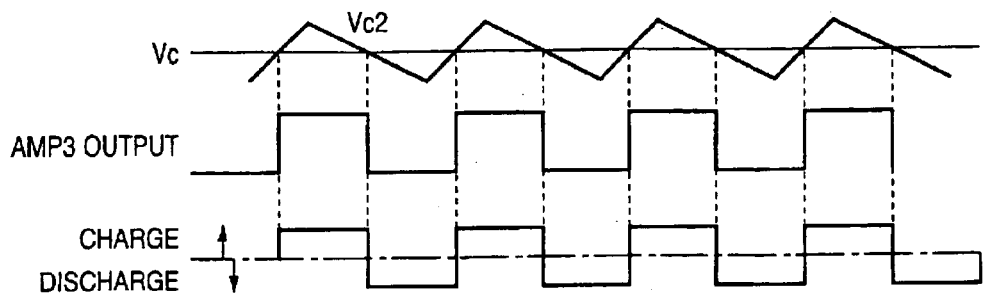
FIG. 3A to 3C are diagrams illustrating the relation between the output of AMP3 and voltage Vc: in the following conditions.
Figure 3:
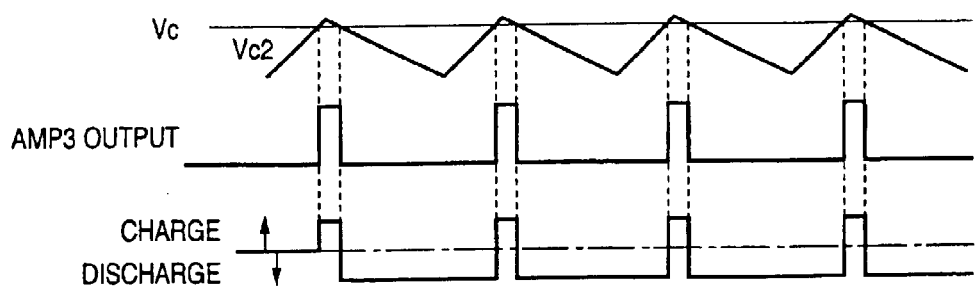
Figure 3:
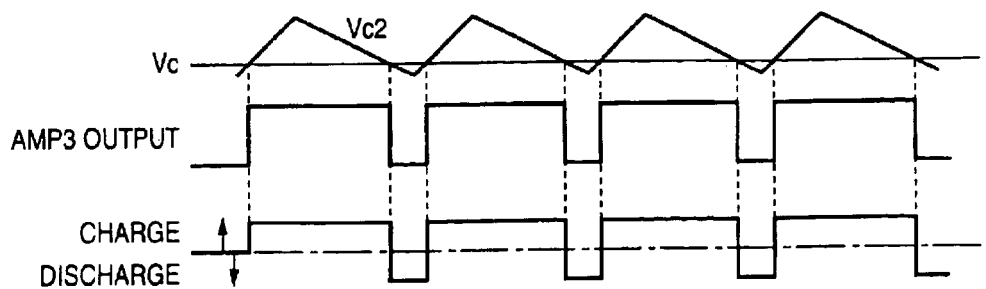

FIG. 3A shows the condition above. When ID grows larger as the motor load increases, Vc2 lowers. The position of Vc2 relatively lowers with respect to Vc and the discharging time of the capacitor C1 becomes longer than the charging time thereof and Vc also lowers (see FIG. 3B)

When the motor load decreases, ID also decreases. Consequently, because Vc2 grows relatively larger than Vc, the charging time of C1 becomes longer than the discharging time thereof and Vc also rises (FIG. 3C). In other words, as Vc is so controlled as to converge at the time average of Vc2 which means that the ratio of time at Vc2>Vc to time at Vc2<Vc is equal, Vc follows the change of Vc2 when Vc2 changes. The follow-up rate of Vc is determined by the size of the charging-discharging current IA and IB and when IA and IB are increased, the follow-up capability of Vc is improved. When the change of Vc2 is slow, a difference between Vc and the time average of Vc2 is decreased and when Vc2 undergoes no change, Vc and the time average of Vc2 conform to each other. When an obstacle is caught in the power window, Vc2 suddenly lowers; however, the charging-discharging current values IA and IB are set so that Vc is unable to follow the lowering rate.

The detection of an obstacle caught in the power window is carried out by comparing Vc with the voltage Vins resulted from dividing voltage (VB2−Vc2) by the resistors R24 and R27.

$$Vins = (VB2 - Vc2) \times R27 / (R24 + R27) + Vc2$$
$$= (VB2 \times R27 + Vc2 \times R24)/(R24 + R27) > Vc2$$

While Vc is following Vc2, Vins>Vc is justified since Vc is substantially equal to the time average of Vc2. As Vins and Vc are connected to the respective plus-side input and minus-side input the output of CMP1 is changed to H. When an obstacle is caught in the power window, Vc2 lowers and so does Vins. However, Vc is unable to lower immediately, whereupon Vins<Vc and the output of CMP1 is changed to L and the current limiting operation is started.

A way of approaching the prevention of misreversing of the power window on a rough road is as follows. The glass driving force varies during travel on a rough road, and ID increases as the driving load increases but Vc2 lowers. When a reduction in speed is great and continued, the current limiting operation is performed and the misreversing of the power window may ensue therefrom. However, the load fluctuation due to travel on a rough road is characterized in that its increase and decrease are brought on alternately. The increase and decrease of the load fluctuation appear in the form of increase and decrease in Ir1.

Although an increase in Ir1 constitutes a primary factor involved in the lowering of Vc2, Ir1 can relatively be decreased by artificially increasing Ir3 with respect to the same Ir since the reference current Ir=Ir1+Ir3. The misreversing of the power window can be prevented by artificially increasing Ir3 when Ir1 is increased and then decreased with the increase and decrease of ID during travel on the rough road so as to restrain an increase in Ir1 in the next phase of the increase of ID. In order to increase Ir3, Vc is artificially lower, which results in widening the interval between the signal Vins as an object for comparison and the reference voltage Vc.

With Vins<Vc while the restraining effect above is being achieved, the prevention of the misreversing of the power window is enhanced by detecting the change of the output of CMP1 from H to L and adding a means for lowering Vc further.

The operation of the rough road detection circuit 3 will be described next. The rough road detection circuit 3 has a series circuit including the capacitor C1 (first capacitor) in the reference-voltage circuit, a diode D102, a capacitor C11 (second capacitor), a resistor R206, and an FET (T201: electronic switch). The DC voltage VB2 is supplied from the on-board battery to one end of the capacitor C1. Further, the source of the FET (T201) is grounded.

Further, the rough road detection circuit 3 has a series circuit including a resistor R200, an FET (T200), and a variable resistor R201. The DC voltage VB2 is supplied to one end of the resistor R200. The gate (node P4) of the FET (T200) is connected to the gate of the FET (T201) via a resistor R202 and a resistor R203 and is grounded via a capacitor C13.

A node P3 between a resistor R202 and a resistor R203 is connected via a capacitor C12 to the output of the amplifier AMP1.

A node P5 between the capacitor C11 and the resistor R206 is connected via a resistor R205 to the drain of an FET (T205) and the gate of the FET (T205) is connected via an invertor INV1 to the output of the comparator CMP1 and also connected via a resistor R25 to a DC power supply of 5V.

The drain (node P6) of the FET (T201) is connected via a resistor R204 to the 5V power supply. A rough road-mode signal output circuit 31 includes the 5V power supply, R207, 208, an FET (T202) and a capacitor C14.

The node between the diode D102 and the capacitor C11 is connected via a diode D103 to the minus-side input of the amplifier AMP2 and to the source of the FET (T21).

The FETs (T200) and (T201) are N-type MOS-FETs. Voltage V10 as a reference voltage is generated at the node P4 by the resistor R200, the resistor R201 and the FET (T200). The variable resistor R201 is provided so as to regulate or change the voltage V10.

The capacitor C12 transmits fluctuation in the output signal of AMP1 as voltage V11 at the node P3.

In normal operation (not traveling on the rough road), the current ID for driving the drive motor M1 flows into the motor driving circuit 1 when the operation of driving the power window is performed. The amplifier AMP1 compares the voltage generated in the shunt resistor Rs of the motor driving circuit 1 with the voltage at the node P1 and feeds a signal proportional to the difference therebetween to the gate of the FET (T22). Thus, the current Ir1 is controlled by the output signal of the amplifier AMP1, which results in making available the current Ir (=Ir1+Ir3) proportional in size to the current ID.

Moreover, the voltage Vins at the node P2 is stable at this time and set so that its value is greater than that of the reference voltage Vc generated at the node P7. Therefore, the output signal of the comparator CMP1 comes to have an H level and the output of INV1 has an L level, so that the FET (T205) is turned off. As the H-level signal is fed into the inverting control circuit 4, no inverting control is performed.

On the other hand, as the fluctuation of the output signal of the amplifier AMP1 is small in the normal operation, the voltage V11 transmitted to the node P3 undergoes no fluctuation. Therefore, the driving voltage is applied to the gate of FET (T201) because of the voltage V10 at the node P4, whereby the FET (T201) is turned on. Consequently, the voltage at the node P6 remains at the ground level.

When an obstacle is caught in the power window in the condition above, the current ID rises because the drive motor M1 is overloaded and this is accompanied with an increase in the current Ir1, whereby the voltage Vins at the node P2 lowers. When the voltage Vins becomes lower than the reference voltage Vc, the output signal of the comparator CMP1 is inverted from H to L and the inverting control circuit 4 performs the current limiting operation including the on/off operation and the operation of continuing the on state. In case that the steep current increase subsides during the current limiting operation, the drive motor M1 is so controlled as to be stopped and then reversed in direction. Thus, trouble arising from causing an obstacle to be caught in the power window can be avoided.

A description will now be given of a case where a vehicle is traveling on a rough road. While the vehicle is traveling on the rough road, current flowing into the drive motor M1 fluctuates irregularly at a frequency of about 10 to 15 Hz as described above. Actually, as the drive motor M1 is a DC motor, the motor current ID has the pulsating component caused by the commutator of the drive motor M1 in a frequency band to 1 KHz and while containing the pulsating component, it pulsates at a frequency of about 10 to 15 Hz.

When the average of the current ID of the drive motor M1 fluctuates, the reference current Ir correspondingly fluctuates and since Ir=Ir1+Ir3, the currents Ir1 and Ir3 also fluctuates. The fluctuation of the current Ir1 appears as the fluctuation of the output signal of the amplifier AMP1. Consequently, according to this embodiment of the invention, the road on which the vehicle is traveling is detected to be in a rough condition when the amplitude of the fluctuating output signal of the amplifier AMP1 becomes larger. A detailed description of a procedure for deciding a road to be in the bad condition will be given below.

When the output signal of the amplifier AMP1 fluctuates, the voltage V11 at the node P3 fluctuates likewise. In other words, the voltage V11 lowers when the level of the output signal of the amplifier AMP1 lowers, so that the charge used to charge the capacitor C12 is discharged. A time constant at this time is given by R202×C12=240KΩ×0.1 $\mu$s=24 ms.

When the level of the output signal of the amplifier AMP1 rises, the voltage V11 also rises and the capacitor C12 is charged with a time constant of 24 ms via the resistor R202.

The variation of the voltage V11 is transmitted via the resistor R203 to the gate of the FET (T201). Thus, the formation of a filter with the resistor R203 and the capacitor C13 permits the pulsating component contained in the voltage V11 to be removed by the filter. The filtered voltage derived from the voltage V11, that is, the fluctuation of the averaged voltage of the amplifier AMP1 is added to the gate-to-source of the FET (T201).

As described above, the reference voltage V10 is set so that the FET (T201) is in the on state in the absence of fluctuation of the output signal (average value) of the amplifier AMP1.

The circuit shown in FIG. 2 has a double function to perform as shown below: (A) a misreversing preventive function by a rough road mode; and (B) a misreversing preventive function by a fluctuation in the output of the CMP1. These functions will be described in detail as follows.

(A) Misreversing Preventive Function in a Rough Road Mode.

When the output signal (average value) of the amplifier AMP1 lowers while a vehicle is traveling on a rough road, the gate voltage of the FET (T201) lowers and when it descends less than the threshold voltage of the FET (T201), the FET (T201) is turned off.

When the FET (T201) is turned off, the voltage at the node P6 rises to 5V from the ground level as positioned before the FET (T201) is turned off as the drain of the FET (T201), that is, the node P6 is connected via the resistor R204 to the 5V power supply.

Consequently, the capacitor C11 is discharged along a route of C11→D103→T21→R20→5V power supply→R204→R206→C11 and the potential difference between both ends of the capacitor C11 decreases from the voltage Vc1 in the on-state of the FET (T201) to Vc1−5V.

The discharge charge of the capacitor C11 is superposed on the current Ir3 before being caused to flow via the diode D103. In other words, the amount of the discharge charge C11×5V flows with a time constant of C11×(R204+R206) and the average value of the discharge current comes to 5V/(R204+R206). As the current Ir1+Ir3 is substantially constant, the current Ir1 decreases to an extent equivalent to the discharge current while the discharge current superposed on the current Ir3 is flowing.

Thus, the lowering of the voltage Vins at the node P2 is restrained and the interval between the voltage Vins and the reference voltage Vc is enlarged, so that the output signal of the comparator CMP1 becomes hardly inverted.

While the vehicle is traveling on the rough road, moreover, the output signal of the amplifier AMP1 invariably turns to rise after lowering once. In other words, since the average value of the current ID flowing into the drive motor M1 varies in the order of 10 to 15 Hz, the level of the output of the amplifier AMP1 rises after lowering once Therefore, the FET (T201) is turned on and the voltage V12 at the node P6 lowers to the ground level. Consequently, the capacitor C11 is charged along a route of voltage Vc→D102→C11→R206→T201→GND. Thus, a charge of C11×5V is drawn out of the minus-side terminal of the capacitor C1 so that the reference voltage Vc lowers.

With the lowering of the reference voltage Vc, moreover, the current Ir3 increases and since Ir=Ir1+Ir3 is substantially constant, the current Ir1 decreases. In consequence, the voltage Vins increases and the interval between the reference voltage Vc and the voltage Vins at the node P2 increases and the comparator CMP1 can hardly be inverted to the L level. In other words, the output signal of the comparator CMP1 becomes hardly switchable to the L level even after the FET (T201) is switched to the on state.

Supposing that it is called the rough road mode that the drain voltage V12 (voltage at the node P6) of the FET (T201) exists between the ground level and 5V (excluding the ground level), the capacitor C11 is discharged when the rough road mode develops, whereas the capacitor C11 is charged when the rough road mode annihilates. While the rough road mode is present, a rough road-mode signal is output from a terminal TA.

Thus, the capacitor C11 is charged and discharged in one cycle of development and annihilation of the rough road mode, whereby the interval between the reference voltage Vc and the voltage Vins is enlarged as the current Ir1 decreases with the voltage Vins rising, so that the misreversing of the power window hardly occurs.

More specifically, the power window hardly moves to the reverse direction when the power window is operated during travel on the rough road by means of decreasing detection sensitivity to reversing of the power window even through the motor current ID slightly fluctuates.

(B) Misreversing Preventive Function by a Fluctuation in the Output of the CMP1.

Subsequently, the misreversing preventive function by a fluctuation in the output of a comparator CMP1 will be described.

With the increase of current flowing into the drive motor M1 and with the lowering of the level of the output signal of the amplifier AMP1 due to travel on the rough road, the rough road mode develops and the lowering of the voltage Vins at the node P2 is restrained. In case that the amount of increase in the current is large, however, the voltage Vins becomes closer to the reference voltage Vc and ultimately may be lower than the reference voltage Vc. Even in this case, it is possible to avoid misjudgment about having an obstacle caught in the power window. This situation will be described hereinbelow.

When the voltage Vins falls below the reference voltage Vc, the output signal of the comparator CMP1 is changed from H to L in level. If the rough road mode is present at this time, that is, in case where the FET (T201) is held off and where the voltage V12 at the node P6 comes to 5V, the voltage at the minus-side terminal (node P5) of the capacitor C11 is also 5V.

With the output signal of the comparator CMP1 having L and with the FET (T205) turned on, the capacitor C11 is charged along a route of reference voltage Vc→D102→C11→R205→T205→GND and as a charge of this amount is drawn out of the capacitor C1, the reference voltage Vc lowers. A charging time constant at this time is set smaller (2.5 µs in the circuit of FIG. 2) and consequently the capacitor C11 is instantly charged, so that the reference voltage Vc is brought down to the extent of charging the capacitor C11.

When the output of the comparator CMP1 is changed to L, the current Ir2 shown in FIG. 2 is caused to flow. The role of Ir2 is as follows. When Ir2 flows, the voltage drop of the resistor R24 is changed from R24×Ir1 to R24×(Ir1+Ir2) and even if Ir1 remains the same, Vins lowers by R24×Ir2. Consequently, the voltage difference at the input of CMP1 is enlarged in the situation of Vc (minus-side input of CMP1) >Vins (plus-side input of CMP) and the output of CMP1 is stabilized to L in level. When the output of CMP1 is changed to L, the voltage added to the FET gate is turned on/off whereby to limit the motor current. However, the motor current decreases because of the on/off action and Ir1 decreases accordingly.

Consequently, Vins rises, which results in Vins>Vc again. Thus, the output of CMP1 is inverted from L to H and Ir2 is cut off. The on/off action is stopped and FET is continuously kept in the on condition. As Vins is excessively raised to the extent that Ir2 is absent, the output of CMP1 is stabilized and maintains H. In other words, Ir2 forms the hysteresis element of CMP1 and its size determines the length of an on/off action period. The greater Ir2 grows, the longer the duration of on/off action becomes. When the output signal of the comparator CMP1 is changed to L, the voltage Vins lowers once since the current Ir2 flows; however, the lowering of the voltage Vc caused by charging the capacitor C11 then permits the voltage Vins to quickly rise. Consequently, the conditions shown by (i) and (ii) are produced.

(i) As the rising of the voltage Vins is accelerated, the on/off action period (a period of time from the on/off action up to the continuous on state) of the inverting control circuit 4 is shortened. Therefore, the number of on/off times is restrained and the number of prescribed times (e.g., eight times) can hardly be reached; that is, the misreversing of the power window is restrained. In other words, even when the voltage Vins becomes lower than the reference voltage Vc because of vibrations generated during travel on the rough road, for example, it is possible to prevent misjudgment about having an obstacle caught in the power window since Vins instantly rises.

(ii) Upon the termination of the on/off action period by the inverting control circuit 4, the voltage Vins parts from the reference voltage Vc and rises, whereupon the rough road mode annihilates. In other words, the inverting operation of the comparator CMP1 is not repeatedly performed a number of times during the development of the rough road mode due to travel on the rough road but performed about several times (one to two times). In case where the inverting operation of the comparator CMP1 during the development of the rough road mode is performed a plurality of times (e.g., three times or greater), it can safely be said that a primary factor in having an obstacle caught in the power window should occur simultaneously while the vehicle is traveling the rough road.

The contents of the description given above can be sorted out as follows. As the average value of the current Ir1 fluctuates during travel on the rough road, the driving road of the vehicle is decided to be in a bad condition when the amount of fluctuation exceeds a predetermined value and a voltage signal corresponding to the rough road mode is generated. In other words, the potential difference between the reference voltage Vc and the voltage Vins during travel on the rough road is expanded to the larger extent than in the normal condition and an unclear decision is made on whether an obstacle is caught in the power window in order to prevent the misreversing of the power window because of the rough road.

Figure 5:
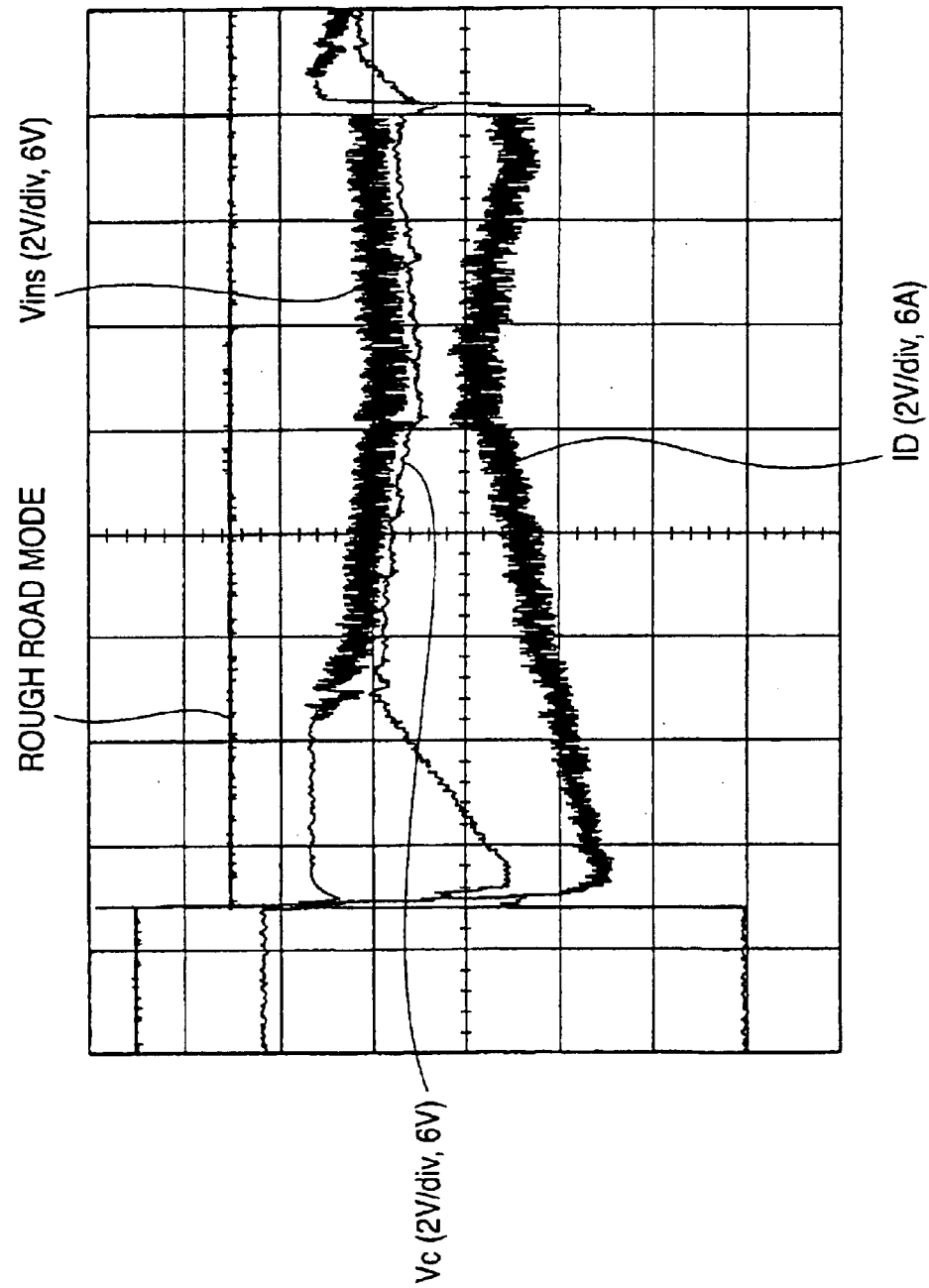
FIG. 5 is a characteristic diagram showing waveforms of motor current ID, signal Vins as an object for comparison, reference voltage Vc and rough road-mode signal when window glass is moved upward from opening the window to its full width up to completely closing the window while the vehicle is in a standstill condition.

FIG. 5 shows waveforms of the motor current ID, the voltage Vins as an object for comparison, the reference voltage Vc and the rough road-mode signal when the power window is moved upward from opening the window to its full width up to completely closing the window while the vehicle is in a standstill condition. The motor current ID least fluctuates. The voltage Vins as an object for comparison is such that its upper and lower parts are symmetrical with respect to the fluctuation of the motor current ID. Vc is positioned under Vins with the time average and the interval between Vins and Vc is substantially constant.

Figure 6:
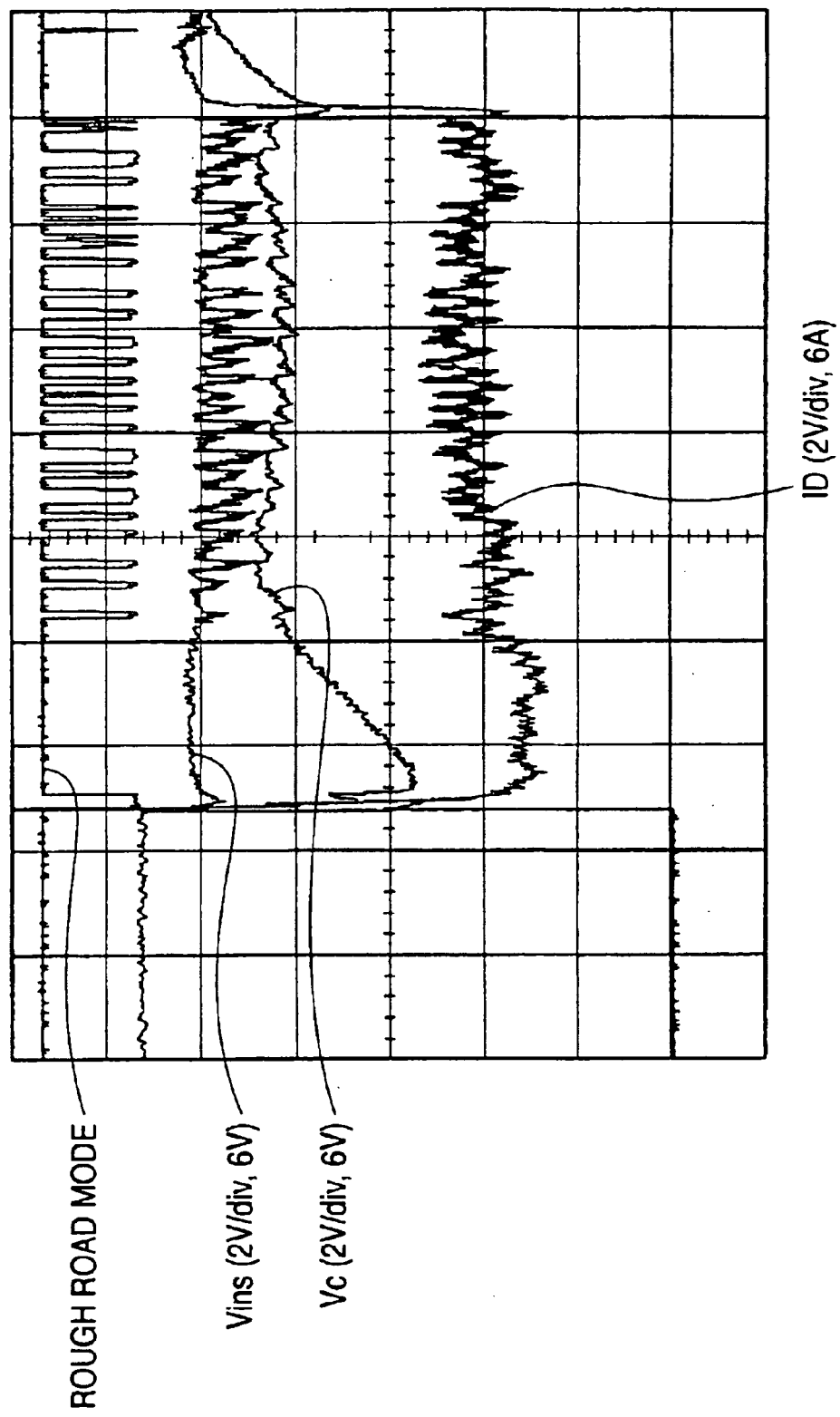
FIG. 6 is a characteristic diagram showing waveforms of motor current ID, signal Vins as an object for comparison, reference voltage Vc and rough road-mode signal when window glass is moved upward from opening the window to its full width up to completely closing the window during travel on the rough road.

FIG. 6 shows waveforms when the power window is moved upward from opening the window to its full width up to completely closing the window during travel on the rough road. ID fluctuates greatly during travel on the rough road and without any measure taken to counter rough roads, the misreversing of the power window occurs since ID steeply increases. With the circuit for dealing with rough roads, the interval between Vc and Vins is enlarged and even when a steep increase in ID arises, Vins>Vc is established, so that the misreversing of the power window is not caused. The rough road-mode signal is generated in response to the increase and decrease of Vins. The rough road-mode signal of FIG. 5 shows the V12 voltage of FIG. 2, whereas the rough road-mode signal of FIG. 6 shows the TA voltage of FIG. 2.

In FIG. 6, Vins is such that its upper and lower sides are asymmetrical with respect to the waveform of ID. Moreover, Vc lowers in synchronization with the annihilation of the rough road-mode signal. With the lowering of Vc, the second current Ir3 increases and in view of Ir=Ir1+Ir3, the first current Ir1 decreases, whereupon the vertical symmetry of the waveform of Vins with respect to ID is destroyed. Consequently, the misreversing of the power window is prevented.

As a method of enlarging the potential difference between the reference voltage Vc and the voltage Vins, there follows a step of drawing a charge of C11×5V out of the minus voltage terminal of the capacitor C1 for generating the reference voltage Vc by using the (capacitor C11 so as to lower the reference voltage Vc. Consequently, discharging the charge stored in the capacitor C11 along the same route as that of the current Ir3, and increasing Ir3 by lowering Vc to relatively decrease Ir1, whereby with the two effects above, the interval between the voltage Vins and the reference voltage Vc is enlarged.

Figuratively speaking, the capacitor C11 performs its role as a bucket for bailing an electric charge corresponding to water from the capacitor C1 corresponding to a water tank. Therefore, the restraining effect (the degree of decreasing sensitivity to an obstacle caught in the power window) is increased by increasing the electrostatic capacitance of the capacitor C11.

As the method of performing the bailing action, there are two methods: one of them is to perform the bailing action once in every cycle of development annihilation of the rough road mode; the other one is to perform the bailing action once each time the on/off action period (a period in which the output signal of the comparator CMP1 remains to be L) produced by the inverting control circuit 4 when the rough road mode is developed. The use of these methods permits it to be detected that the vehicle is traveling on the rough road, thus resulting in avoiding any trouble arising from misreversing the power window during travel on the rough road.

A description will now be given of the art of distinguishing between the development of the rough road mode and the situation in which an obstacle is actually caught in the power window. When the rough road mode is developed, the interval between the voltage Vins and the reference voltage Vc is enlarged, whereupon an unclear decision is made on whether an obstacle is caught in the power window. Therefore, an inverting load (for use in stopping and reversing the drive motor M1) increases when an obstacle is actually caught in the power window during travel on the rough road and the motor may not be reversed in direction until a lock current is supplied according to circumstances. Particularly when an obstacle is caught in the inclined plane of a window frame, the motor may not be reversed in direction.

When an obstacle is caught in the power window, the voltage Vins lowers and the on/off action is performed by the inverting control circuit 4 whereby to cut off the motor current. Then it is only needed to set the reference voltage V10 at the node P4 of FIG. 2 and the time constant C11×(R204+R206) so that the rough road mode is not developed by the lowering amount and rate of the voltage Vins when an obstacle is caught in the power window. However, it is still not easy to avoid completely the development of the rough road mode while an obstacle is being actually caught in the power window because of variations in circuit constants. The rough road mode is performed while an obstacle is being actually caught in the power window, the on/off action is restrained and the motor current is hardly cut off.

Therefore, according to this embodiment of the invention, the rough road mode developed during travel on the rough road is repeatedly developed and annihilated, and even when the inverting operation of the comparator CMP1 is performed during the development of the rough road mode, a decision is made on whether the rough road mode is in existence or whether an obstacle is actually caught in the power window by utilizing the fact that the inverting operation is repeated several times at most (say once or twice). More specifically, in case that the rough road mode is developed while an obstacle is being actually caught in the power window or in case that an obstacle is actually caught in the power window while the rough road mode is developed, the inverting operation of the comparator CMP1 is repeated a plurality of times (e.g., three times or greater) while the rough road mode is developed, whereby the drive motor M1 is stopped and then reversed in direction when it is decided that an obstacle is actually caught in the power window by discerning the obstacle actually caught in the power window using the difference between the two cases above.

Figure 4:
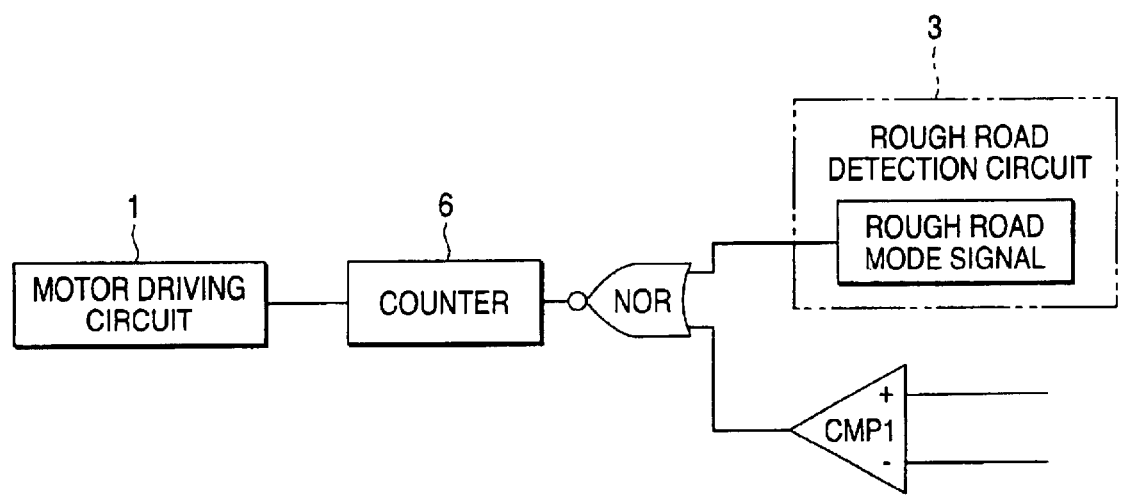
FIG. 4 is a circuit arrangement for use in reversing the motor when a rough road-mode signal is generated.

As specific examples, the following (a)–(c) are shown with reference to a block diagram of FIG. 4.

(a) When the inverting operation of the comparator CMP1 is repeated a plurality of times (e.g., three times or greater) while the rough road mode is developed, the motor current of the drive motor M1 is cut off and the drive motor M1 is reversed in direction. This can be done by counting the number of inverting operations of the comparator CMP1 when the rough road-mode signal is supplied from the terminal TA in the rough-road-mode signal output circuit 31.

(b) Although the voltage V12 at the node P6 rises up to 5V in the rough road mode, the voltage V12 also drops to L when the output signal of the comparator CMP1 is changed to L. Hence, as the output signal of the comparator CMP1 is not usable as a rough road-mode signal for use in (a), a rough road-mode signal without being interrupted by the output signal of the comparator CMP1 is generated and used by providing a rough road-mode signal output circuit 31 comprising the FET (T202), the resistors R204, R207 and R208 and the capacitor C14.

(c) As the rough road detection circuit 3 is usable as a means for deciding whether an obstacle is caught by the power window, two kinds of decision methods are used simultaneously; namely, the proper decision method of counting the number of on/off actions while the rough road mode is developed and the decision method by means of the output signal of the comparator CMP1 (the decision based on the number of inversions of the comparator CMP1).

In the power window driving device according to this embodiment of the invention, the vehicle is thus decided to be traveling on the rough road when the component pulsating at a frequency of about 10 to 15 Hz is generated in the motor current and control is exerted so that the interval between the voltage Vins (comparison signal) used for detecting a steep current increase and the reference voltage Vc is enlarged. Therefore, the comparison signal (voltage Vins) is prevented from becoming lower than the signal as a reference value (voltage Vc) even when a certain amount of current fluctuation is produced during travel on the rough road, so that the misreversing of the power window can be avoided.

While the vehicle is traveling on the rough road, further, as the number of inversions of the comparator CMP1 increases (e.g., three times or greater) in the rough road mode when an obstacle is actually caught in the power window, the occurrence of pinching the obstacle in the power window is detectible for certain by counting the number of inversions even during travel on the rough road.

Figure 7:
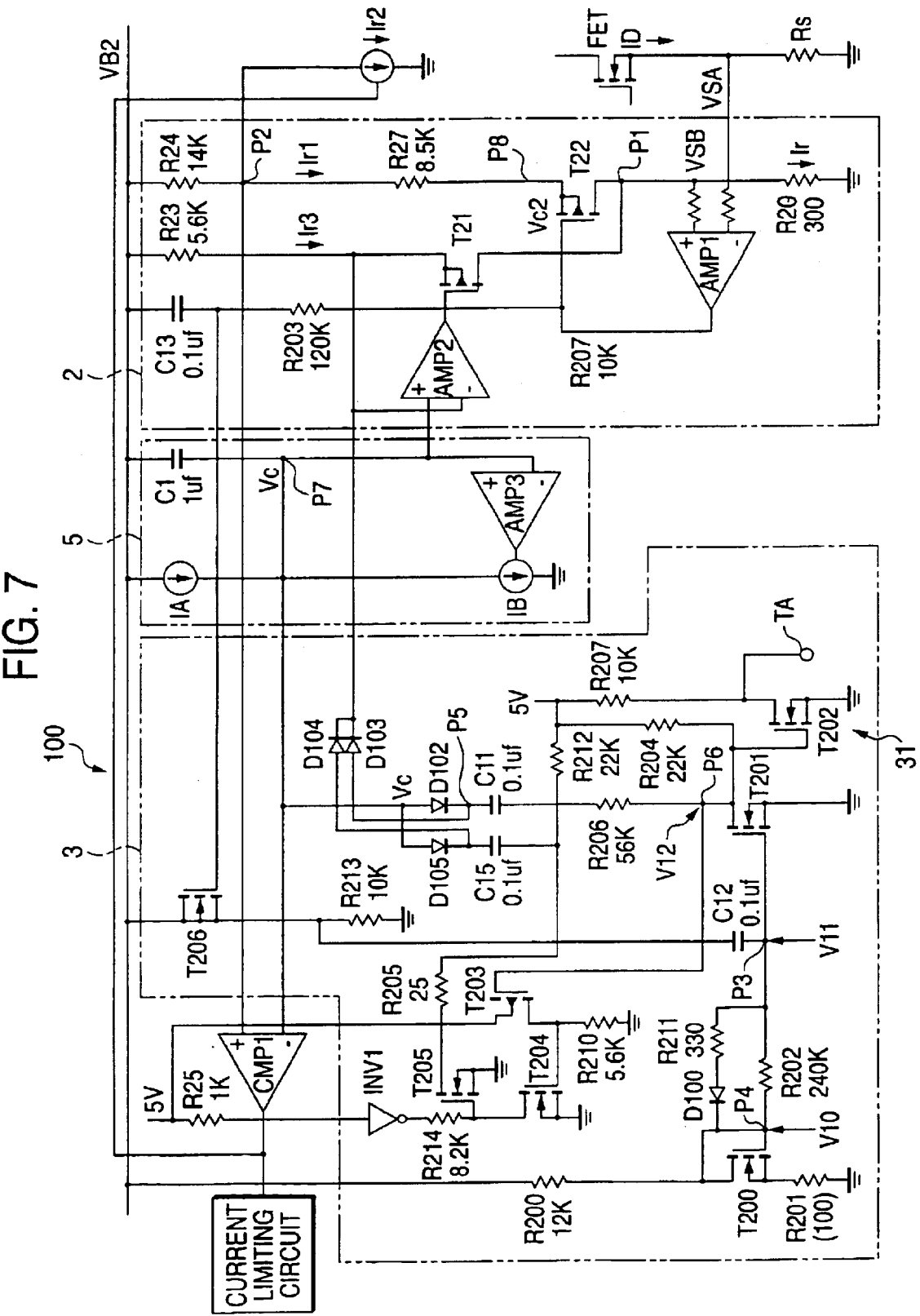
FIG. 7 is a circuit diagram showing the construction of a power window driving device according to a second embodiment of the invention.

FIG. 7 shows a second embodiment in the form of a circuit for dealing with rough roads. The operation in FIG. 7 will be described in comparison with FIG. 2.

(1) The position of a filter including R203 and C13 is changed. This filter is used for removing a pulsating voltage component caused by the function of a motor commutator and though the above process has been performed within the rough road detection circuit 3 as shown in FIG. 2, the filter is placed in a position were a signal voltage is fed into a rough road circuit from the output of the amplifier AMP1 as shown in FIG. 7. Thus, the influence of the pulsating voltage can completely be removed. The signal voltage passed through the filter is added to the capacitor C12 via a buffer in a source-follower form.

(2) In order to decrease the time constant on the charging side of the capacitor C12, a circuit formed by connecting a diode D100 and a resistor R211 in series is added to the resistor R202 in parallel. This is intended to expedite the charging of C12 when the output of AMP1 rises so as to turn off T201 in a sensitive manner when the output of AMP1 drops later.

(3) The capacitor C15 for performing the bailing action with the output of CMP1 is separated from the capacitor C11 for performing the bailing action due to the development and annihilation of the rough road mode. For this reason, diodes D104 and D105 and a capacitor C15 are additionally arranged. Moreover, FETs 203 and 204, resistors R210, 212–214 are additionally arranged so that only when the voltage V12 at the node P6 sufficiently rises close to 5V, C15 performs the bailing action. With V12<5V−(threshold voltage of T203), T205 cannot be turned on because T203 and T204 are turned on to ground the gate of T205 even if the output of CMP1 is changed to L, that is, even if the output of the inverter INV1 is changed to H accordingly. With V12>5V−(threshold voltage of T203), the bailing action of C15 is performed as T205 is turned on when CMP1 is changed to L after T203 and T204 are turned off.

(4) Since addition of the charging-discharging circuit of C5 accomplishes that the voltage V12 never falls to GND even if the output of CMP1 is changed to L while T201 is turned off, the capacitor C14 and the resistor R208 of the rough road-mode signal output circuit 31 are removed.

What is claimed is:

1. A power window driving device, comprising:
a reference-current generator, generating a reference current having a level which corresponds to the size of a motor current flowing into a drive motor for driving a power window;
a first current generator, generating a first current which is a part of the reference current and corresponds to a variable quantity in the motor current;
a second current generator, generating a second current which is a part of the reference current and to which adding the first current results in the prescribed reference current;
a comparison signal generator, generating a comparison signal by converting the first current into voltage;
a comparator, comparing the comparison signal with a reference voltage signal generated on the basis of the first current; and
a reverser, stopping or reversing the drive motor based on a result of the comparator which determine that a steep current increase is occurred in the motor current,
wherein when the first current repeats decrease and increase in excess of a predetermined value in a predetermined period, the second current is increased for a predetermined period in respective cycles of the decrease and the increase of the first current so that the increase of the first current is relatively retrained or the decrease of the first current is relatively promoted for decreasing a detection sensitivity to a current increase in the motor current.

2. The power window driving device as set forth in claim 1, wherein the second current is increased by decreasing the reference voltage signal for a predetermined period in the respective cycles of the decease and the increase of the first current.

3. The power window driving device as set forth in claim 1, wherein a capacitor is connected to a reference voltage signal source;
wherein in the cycle of increase of the first current, the capacitor is discharged so as to flow a discharge current from the capacitor into the route of the second current in a superposed condition, so that the second current is increased; and
wherein in the cycle of decrease of the first current, the capacitor is charged with a current from the reference voltage signal source so as to decrease the reference voltage signal, so that the second current is increased.

4. The power window driving device as set forth in claim 1, further comprising a rough road-mode signal generator, outputting a rough road-mode signal in the cycle of increase of the first current, and stopping the rough rode-mode signal in the cycle of decrease of the first current,
wherein the second current is increased for a predetermined period each time an output of the comparator is inverted from an output at a normal state, while the rough road-mode signal is output.

5. The power window driving device as set forth in claim 4, wherein a capacitor is connected to a reference voltage signal source; and
wherein the capacitor is charged with a current from the reference voltage signal source so as to decrease the reference voltage signal while the rough road-mode signal is output when an output of the comparator is inverted from the output at the normal state, so that the second current is increased.

6. The power window driving device as set forth in claim 4, further comprising a counter, counting the number of times the output of the comparator is inverted from the output at the normal state while the rough road-mode signal is output,
wherein when the count exceeds a predetermined number of times, the reverser stops or reverses the drive motor.

7. The power window driving device as set forth in claim 1, wherein the reference voltage signal is gated from a voltage which is converted from the first current by means that the ratio of the time when the reference voltage is higher than the converted voltage to the time when the reference voltage is lower than the converted voltage converges to 1.

* * * * *